United States Patent [19]

Shurling, Jr. et al.

[11] Patent Number: 5,713,998
[45] Date of Patent: Feb. 3, 1998

[54] METHOD FOR PRODUCING HIGH OPACIFYING KAOLIN PIGMENT

[75] Inventors: Dickey S. Shurling, Jr.; Teresa Anderson Rhodes; Connie Carol Brown, all of Sandersville; Ronald Wayne Underwood, Tennille; William Leonard Garforth; Anthony Allan May, both of Sandersville, all of Ga.

[73] Assignee: ECC International Inc., Roswell, Ga.

[21] Appl. No.: 388,354

[22] Filed: Feb. 14, 1995

[51] Int. Cl.$^6$ .................................................. C04B 14/04
[52] U.S. Cl. ..................... 106/486; 106/416; 106/439; 106/484; 501/145; 501/150
[58] Field of Search ........................... 106/416, 439, 106/484, 486; 501/145, 150

[56] References Cited

U.S. PATENT DOCUMENTS

| | | | |
|---|---|---|---|
| 3,586,523 | 6/1971 | Fanselow et al. | 106/486 |
| 3,627,678 | 12/1971 | Marston | 210/695 |
| 4,246,039 | 1/1981 | Mixon, Jr. | 106/484 |
| 4,381,948 | 5/1983 | McConnell et al. | 501/145 |
| 4,518,491 | 5/1985 | Bilimmoria et al. | 209/166 |
| 4,717,559 | 1/1988 | Cummings et al. | 501/150 |
| 4,962,279 | 10/1990 | Anderson | 501/150 |
| 5,011,534 | 4/1991 | Berube et al. | 106/416 |
| 5,047,375 | 9/1991 | Dunaway et al. | 106/439 |
| 5,129,953 | 7/1992 | Suitch et al. | 106/416 |
| 5,137,574 | 8/1992 | Suitch et al. | 106/439 |
| 5,371,051 | 12/1994 | Pope et al. | 501/145 |
| 5,385,239 | 1/1995 | Kunkle et al. | 106/486 |

*Primary Examiner*—Mark L. Bell
*Assistant Examiner*—Scott L. Hertzog
*Attorney, Agent, or Firm*—Suzanne Kikel

[57] ABSTRACT

An improvement is disclosed applicable to the method for producing a calcined kaolin by the steps of wet beneficiating a crude kaolin to form a slurry of the beneficiated kaolin; dewatering the slurry to form a substantially dry calciner feed; and calcining the feed at a temperature of at least 1450° F. by passing a stream of hot gases through a calciner in which the kaolin feed is resident, whereby an exhaust stream of hot gases is generated which entrains quantities of partially calcined and hydrous kaolin pigment fines. The improvement, enabling useful application of the kaolin pigment fines, comprises recovering the kaolin pigment fines from the exhaust stream for use in papermaking. The fines can be recovered at a wet scrubber, and after being partially dewatered, shipped directly as a product slurry to the paper maker.

16 Claims, 1 Drawing Sheet

METHOD FOR PRODUCING HIGH OPACIFYING KAOLIN PIGMENT

BACKGROUND OF THE INVENTION

This invention relates generally to calcined clay products, and more specifically relates to a kaolin clay pigment which is comprised of fines recovered from the hot exhaust gases which exit the calciner during the normal calcining process. The pigment produced by the method of the invention has a low abrasion and high light scatter and opacifying properties when incorporated as a filler or coating in paper products.

In the course of manufacturing paper and similar products, it is well known to incorporate quantities of inorganic materials into the fibrous web in order to improve the quality of the resulting product. The use of appropriate such fillers vastly improves the opacity and printability of certain types of light weight papers such as newsprint. This aspect of use of calcined kaolin clay pigments is discussed in some detail, for example, in Fanselow and Jacobs, U.S. Pat. No. 3,586,523. Other aspects of the presently preferred commercial methods for manufacturing calcined kaolin pigments for use particularly as fillers in paper manufacture, are also set forth in the said Fanselow et al patent, as well as in additional United States patents such as McConnell et at, U.S. Pat. No. 4,381,948.

The Fanselow et al and McConnell et al patents are indeed representative of the methodology widely employed in the kaolin industry in order to produce calcined kaolin clay pigments for use in paper manufacturing. Study of these patents will show that the objective of same, as is customary in the art, is to produce a fine particle size calcined kaolin clay pigment of relatively very high brightness, beginning with a crude kaolin which has a relatively very low brightness. A preferred crude feed material for use in processes such as are disclosed in the Fanselow and McConnell patents, is a highly discolored, so-called "gray" kaolin, which is referred to in the Fanselow patent as a "hard sedimentary kaolin clay." Thus, the gray crude which is used in the example of Fanselow has an initial brightness of 78, where the figure cited refers to the so-called G.E. scale. Procedures for measuring brightness as set forth in this application, and as is generally recognized in the industry, are in accord with TAPPI procedure T646os75. As a result of the beneficiation treatment set forth in the Fanselow et al patent, these brightnesses are considerably increased, indeed to a very high whiteness. Claim 2 of the Fanselow et al patent thus recites a G.E. brightness within the range of 92% to 95%. Similarly, the McConnell et al patent describes a resultant pigment having a brightness of at least 93 as being the final output product from practice of the beneficiation methods set forth therein. A calcined kaolin pigment substantially produced in accordance with the McConnell et al patent is available commercially from ECC International Inc. of Atlanta, Ga., under the trademark ALPHATEX®.

It may be noted that both the McConnell et al. and the Fanselow et al. patents are concerned with fully calcined kaolins as opposed to metakaolins. When an uncalcined kaolin is heated (i.e. calcined) to about 1098° F. an endothermic reaction occurs. Essentially all of the water of hydration associated with the uncalcined kaolin crystals is eliminated and an essentially amorphous (as measured by X-ray diffraction) material referred to as "metakaolin" results. If the kaolin is heated to higher temperatures, further significant changes occur. The metakaolin undergoes an exothermic reaction (which typically occurs at about 1700° to 1800° F.). Such material is then referred to as a "fully calcined kaolin". It may be further noted with respect to terminology, that the prior art literature, including numerous of the prior art patents relating to the field of kaolin products and processing, often uses the term "hydrous" to refer to a kaolin which has not been subjected to calcination—more specifically, which has not been heated to temperatures above about 450° C. for a sufficient time to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure. Although in a completely accurate technical sense, the characterization of these materials as "hydrous" has been disputed, the present specification in consideration of universal commercial usage in the industry, uses the term "hydrous kaolin" as aforesaid.

In the McConnell patent, it is emphasized that the crude used to produce the high brightness pigments preferably includes not more than 2% by weight of titanium expressed as $TiO_2$. A principal reason for this is that clay minerals occurring in nature, including kaolin clays, frequently contain their discoloring contaminants in the form of iron and/or titanium-based impurities. The quantities of the titaniferous impurities in sedimentary kaolins of Georgia are significant and are commonly present as iron oxide-stained titanium oxides. Irrespective of whether calcining is used, it has commonly been considered in the kaolin industry that it is important to refine the crude kaolins to bring the brightness characteristics of the resultant product to a level acceptable for various applications such as paper coating, or as mentioned, even for filling. Among the techniques which have been used in the past to remove the discoloring impurities, are the use of hydrosulfites for converting at least part of the iron-based impurities to soluble form, which may then be extracted from the clay. A further method which has come into increasing use in the kaolin industry involves the use of high intensity magnetic separation as described, for example, in such patents as Marston, U.S. Pat. No. 3,627,678. This method is also useful in removing titaniferous impurities in that although titania when pure has little magnetic attractability, the iron-stained titania which forms the basis (as mentioned) for the bulk of discolorants in many kaolins, may often be quite effectively removed by imposition of such a high intensity magnetic field.

One of the further, very effective methods for removing titaniferous impurities including iron oxide-stained titanium oxides, is the froth flotation technique. Generally according to this method, an aqueous suspension or slurry of the clay is formed, the pH of the slurry is raised to an alkaline value and a collector agent is added. The slurry is then conditioned by agitating for a short period. A frothing agent if necessary is added to the conditioned slurry, after which air is passed through the slurry in a froth flotation cell to effect separation of the impurities from the mineral.

Further details regarding the use of froth flotation techniques for removing titanium-based impurities from kaolins may be found at numerous places in the prior art, including for example U.S. Pat. Nos. 3,450,257 to E. K. Cundy, 4,518,491 to B. M. Bilimoria, and U.S. Pat. No. 4,090,688 to Alan Nott. In the procedures set forth in these patents, the iron-stained titania "contaminants" are separated with the froth. These separated materials, because of their very high titania content and high degree of discoloration, have in the past simply been termed "rejects," and as such discarded or used for some purpose unrelated to being pigments for paper manufacture. What therefore is to be especially appreciated, is that the discoloring iron-stained titania-based impurities removed from the crude kaolin by froth flotation (or even where such materials have been removed by magnetic separation), have heretofore been regarded as essentially useless material having little or no economic value for proper manufacture. The view in short, has in the past been that the object of beneficiation of kaolins was simply stated to remove these "contaminants" to thereby brighten the output product from which these contaminants had been removed.

Both the brightness characteristics of the given kaolin and the opacifying properties of same when incorporated as a filler in paper, may be quantitatively related to a property of the filler identified as the "scattering coefficient S". The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,726 and 4,028,173. In addition to the citations set forth in these patents, reference may further be had to Pulp and Paper Science Technology, Vol. 2 "Paper", Chapter 3, by H. C. Schwalbe (McGraw-Hill Book Company, New York).

One of the long-recognized concerns that arises where a kaolin clay is subjected to calcination is the increase in abrasiveness, which can result from the formation of various abrasive phases during the calcination process. The presence of iron in the form e.g. of iron-stained titania, can promote the formation of these undesired phases, and thereby contribute to the unwanted abrasiveness in the calcined product. It is therefore a concern that any process which promotes the presence of high titania content in the calciner feed, could lead to a calcined product having undesirably high abrasion characteristics. Such abrasiveness is detrimental to the principal use of the pigments, since among other things, it effects rapid wear at portions of the paper making apparatus. The generation of abrasive phases is a particularly acute problem where the higher temperatures incident to full calcination are employed.

In accordance with the teachings of U.S. Pat. No. 5,047,375, and contrary to prior experience and practice in the kaolin industry, it was found that a pigment possessing highly useful properties, especially with respect to opacifying light weight paper such as newsprint, may be produced by calcining the very high titania content "rejects" yielded by practice of conventional froth flotation beneficiation. Other "rejects" having similar high content of iron-stained titania, as for example those yielded from high intensity magnetic separation (H.I.M.S.), may also be used in the invention disclosed in the U.S. Pat. No. 5,047,375.

According to such patent, an iron-stained titania-containing kaolin is subjected to froth flotation, after which froth "rejects" comprising kaolin enriched in said iron-stained titania are recovered, then subjected to dewatering and drying, to thereby produce a kaolin enriched in titania. This intermediate is calcined at a temperature in the range of about 1500° to 2200° F. to yield the finished product. The froth "rejects" are not otherwise beneficiated prior to calcining, but are used in their as-is form as recovered from the flotation process. The starting material subjected to the froth flotation is typically a naturally occurring kaolin crude having a titania content of from about 1 to 2 weight %, and the enriched kaolin yielded from the froth flotation process has a titania content of from about 2 to about 15 weight % and preferably has a titania content of at least 5 weight %. Similar considerations apply where H.I.M.S. is the source of the rejects. When the pigment produced in accordance with the U.S. Pat. No. 5,047,375 is utilized in the filling of paper, it imparts a brightness in the range of about 60 to 90, but yields substantially higher opacifying properties than a prior art calcined kaolin not enriched in titania. Yet more preferably, the brightness of the pigment resulting is in the range of about 60 to 80. Pigments having these brightness values had previously been considered undesirable for use as fillers; but in accordance with the U.S. Pat. No. 5,047,375 invention, these fillers were found to produce very high opacifying properties, thereby vastly improving the use and printability of such thin, "low grade" papers such as newsprint.

A related teaching is found in U.S. Pat. No. 5,137,574, where the high opacifying pigment is produced by calcining one or more high titania content kaolin fractions which are separated from a whole crude by size classification, froth flotation, magnetic separation or the like.

In one method of practicing the U.S. Pat. No. 5,137,574 invention, there is separated from one or more iron-stained titania-containing crude kaolins having a titania content of from about 1 to 2 weight percent, one or more titania-enriched kaolin fractions, containing titania in the amount of above 2 weight percent. The one or more enriched kaolin fractions are subjected to wet particulate media grinding. The ground fraction or fractions are dewatered and dried, and then calcined at a temperature in the range of about 1500° to about 2200° F. The products yielded from calcination can then be pulverized to a desired screen size to yield the finished product.

The one or more separated kaolin fractions may include the reject portion from a froth flotation treatment of the iron-stained crude kaolin. Each of the fraction or fractions subjected to media grinding contains over 2% titania. If only a single fraction is used, its titania content will be up to about 3%. If multiple fractions are used, some may have as much as 8% titania; but the relative proportions of the several fractions is such that the total material subjected to the media grinding has a titania content of from 2 to 3%. Preferably the one or more fractions are thus sandground to provide a P.S.D. of sufficient fineness so that at least 90%<2 µm (by weight).

In a preferred procedure of the U.S. Pat. No. 5,137,574, the one or more media ground fractions are blended with a free particle size unground kaolin prior to calcining. The unground kaolin can e.g. be the recovered product from a centrifuge separation incident to beneficiation of a kaolin crude, and has a titania content of less than 2%. The unground kaolin is already of reduced particle size (e.g. being the fine cut from centrifuging, such as 92%<2 µm), and as is known, will therefore be relatively free of elements which generate abrasive phases upon calcining. The proportion of the media ground fraction or fractions to the unground kaolin is such as to provide a kaolin calciner feed with above 2% to about 3% titania. The one or more fractions may comprise 30 to 50% of the blend, and the unground kaolin comprises the balance.

The use of the aforementioned media grinding step is deemed necessary in the U.S. Pat. No. 5,137,574 in order to reduce the particle size of the separated fraction or fractions, in that by virtue of the use of a titania-enriched fraction, the abrasion of the final calcined product can become unacceptably high. By reducing the particle size of the ground product to a range such that at least 85% (and preferably 90%) by weight are beneath 2 micrometers, the high titania content does not unduly affect the abrasion, while at the same time the opacifying properties of the pigment are substantially retained. The grinding step is preferably accomplished by use of a media such as fine sand, silica, quartz or the like.

The brightness of the high opacifying fully calcined pigment resulting from the process of the U.S. Pat. No. 5,137,574 is in the range of about 70 to 82. The Bruening abrasion is less than 42, and the titania content is greater than 2% by weight. The Bruening abrasion is preferably below 35, and may be in the range of 20–35. (Bruening abrasion as a measurement standard has in recent years been superceded by Einleiner abrasion, infra.) To be noted is that brightness values as indicated have typically been considered undesirable for use as fillers; but in accordance with the U.S. Pat. Nos. 5,074,375 and 5,137,574, these fillers have been found to produce very high opacifying properties, thereby vastly improving the use and printability of such thin, "low grade" papers such as newsprint.

A further pertinent teaching is found in Berube et al., U.S. Pat. No. 5,011,534. In the method disclosed therein a low abrasion kaolin clay pigment suitable for filling paper is produced from mechanical pulp by selecting a kaolin crude composed of kaolin particles having a low crystallinity index, a G.E. brightness below 82%; a particle size distribution such that at least 75% by weight is finer than 2 microns; the kaolin containing at least 1.2% by weight $Fe_2O_3$ and at least 2% by weight $TiO_2$. The crude is formed into a dispersed aqueous pulp containing at least about 55% clay solids, centrifuged to remove grit, and without subjecting the resulting degritted slip to bleaching or further particle size fractionation is spray dried to produce pulverulent microspheres. The microspheres are pulverized and calcined until the kaolin undergoes at least partially the characteristic kaolin exotherm (in the Example the Samples are heated to 1900° F.), and then repulverized. The resulting calcined clay has a G.E. brightness from 70 to 84%.

In accordance further with the U.S. Pat. No. 5,371,051 it was found that calcined kaolin pigments of high opacifying properties and low abrasion, may be produced by a process which is simplified and economically advantageous as compared to the processes of the aforementioned U.S. Pat. Nos. 5,047,375 and 5,137,574, and which nonetheless produce products which are equal or superior to those produced by the processes of the said patents.

According to the U.S. Pat. No. 5,371,051, a kaolin crude is selected having a G.E. brightness in the range of 70 to 80, a titania content of 2.0 to 3.0% by weight, less than 2% iron expressed as $Fe_2O_3$, and a particle size distribution such that at least 88% by weight of the particles of said crude are of less than 2 µm E.S.D. The crude is blunged with water, and the resultant slurry degritted to form an aqueous slurry having at least 65% by weight solids. The slurry is centrifuged and a fraction recovered having over 65% solids, and in which at least 92% by weight of the particles are of less than 2 µm. The recovered fraction is dried to less than 1% moisture, and pulverized to break up agglomerates. The pulverized fraction is then calcined by heating same to 1450° to 1600° F., after which the calcined kaolin is milled to yield a product having a G.E. brightness of 79 to 81, and an Einleiner abrasion (see U.S. Pat. No. 5,011,534) of not more than 2.5 mg weight loss.

The crude utilized in the U.S. Pat. No. 5,371,051 process preferably has a G.E. brightness which is less than 80. The calcining can be carried out in a conventional vertical calciner such as a Hereschoff furnace.

When a pigment produced in accordance with the U.S. Pat. No. 5,371,051 is utilized in the filling of paper, it imparts a sheet brightness in the range of about 58 to 60 when used in newsprint, up to about 82 when incorporated in a bleached furnish, and yields excellent opacifying properties.

In the course of conducting calcining operations as described in the aforementioned patents, the hot gases used to heat the kaolin exit from the calciner as a hot exhaust stream. This stream is well-known to entrain very considerable quantities of kaolin fines, which fines are at various stages of calcination—depending on the type of calciner, flow rates, temperatures in the calciner and the like. The prior art, taking cognizance of these frees, have in some instances sought to make use of same.

In U.S. Pat. No. 4,717,559, for example, the calciner is integrated with a preceding spray drier by cycling the dust-laden calciner off-gases to the spray drier to achieve savings in energy. Waste heat from the calciner, and the fines carried in the off-gas, are thereby passed to the drier. The dry kaolin is then pulverized and recycled to the calciner.

Similarly in U.S. Pat. No. 4,962,279, the exhaust gases from a calciner, carrying calciner fines, are provided to a spray drier which otherwise dries the beneficiated crude feed slurry. The spray dried material which thus includes the exhaust fines, is then pulverized and is recycled to the calciner.

A further patent of interest is U.S. Pat. No. 4,246,039. As one aspect of this disclosure, hot exhaust gases from a kaolin calciner are passed in conventional fashion to a wet scrubber. These hot gases are used at the scrubber to preheat the feed suspension of the input hydrated clay which is to be calcined. This is particularly valuable in the invention of the said patent in that a so-called electrically augmented vacuum filter—or EAVF—is used to partially dewater the suspension, and the EAVF is more efficient where the feed to same is at higher temperatures. In any event, the partially dewatered slurry is eventually spray dried, pulverized and then passed to the calciner. Thus again any fines carried by the calciner exhaust gases which pass from the scrubber to the EAVF, eventually are recycled to the calciner.

SUMMARY OF INVENTION

The present invention is applicable to the method for producing a calcined kaolin by the steps of wet beneficiating a crude kaolin to form a slurry of the beneficiated kaolin; dewatering the slurry to form a substantially dry calciner feed; and calcining the feed at a temperature of at least 1450° F. by passing a stream of hot gases through a calciner in which the kaolin feed is resident, whereby an exhaust stream of the hot gases is generated which entrains quantities of kaolin pigment fines. The improvement enables useful application of the kaolin pigment fines, and comprises recovering the pigment fines from the exhaust stream, and providing an aqueous slurry of the kaolin pigment fines for use in papermaking. The recovered pigment typically has a brightness of from 72±2 to 78±3, although the pigment in some cases may be brighter where certain higher brightness crudes are used in preparing the calciner feed. Where the crude kaolin has been calcined at temperatures in the range of 1900° F. to 2100° F., the recovered pigment preferably has a brightness of 78±2, a porosity of 0.8 to 0.9 $^c/g$, and an einleiner abrasion of 2 to 3 mg weight loss based on 100,000 revolutions.

The fines are typically recovered by passing the exhaust gases through a wet scrubber to recover a dilute slurry, which is thereupon partially dewatered. The wet beneficiation of the kaolin crude may includes a step of magnetic separation wherein the kaolin is passed as an aqueous slurry through a porous ferromagnetic magnetic matrix positioned in a magnetic field to remove titaniferous impurities from the kaolin, the matrix being periodically flushed with water to remove the accumulated impurities. In such event, the flush water carrying the titaniferous impurities can be used to effect the scrubbing of the exhaust gases, whereby the separated titaniferous impurities are recovered and usefully added to the product slurry for use in the papermaking.

The dilute slurry from the scrubber typically has a solids content of 2 to 7%; and is partially dewatered to a solids content of 39 to 41%. The step of partial dewatering may include passing of the dilute slurry from the scrubber through a disc nozzle centrifuge where work performed on the kaolin fines breaks up aggregates to reduce the +325 mesh residue in the product kaolin pigment fines. The clear water overflow from the centrifuge can be recycled to the wet scrubber as a significant water conservation measure.

In a further aspect of the invention, the dilute slurry of kaolin fines from the wet scrubber can be partially dewatered to around 40% solids and spray-dried to yield a substantially dry product for shipping to the paper maker. At the paper mill this product is reslurried to around 30% solids and then directly added into the paper furnish.

In a still further aspect of the invention a high opacity kaolin pigment is provided for use in papermaking, comprising partially calcined and hydrous kaolin fines which have been recovered as calciner dust from the exhaust gases generated during calcining of a kaolin crude at temperatures of at least 1450° F. The kaolin pigment has a brightness of from 72±2 to 78±3. Where the crude kaolin has been calcined at temperatures in the range of 1900° F. to 2100° F., the pigment has a brightness of 78±2, a porosity of 0.8 to 0.9 $^c$/g. and an einleiner abrasion of 2 to 4 mg weight loss. More preferably the einleiner abrasion is in the range of 2 to 3 mg weight loss.

DESCRIPTION OF PREFERRED EMBODIMENT

Figure 1:
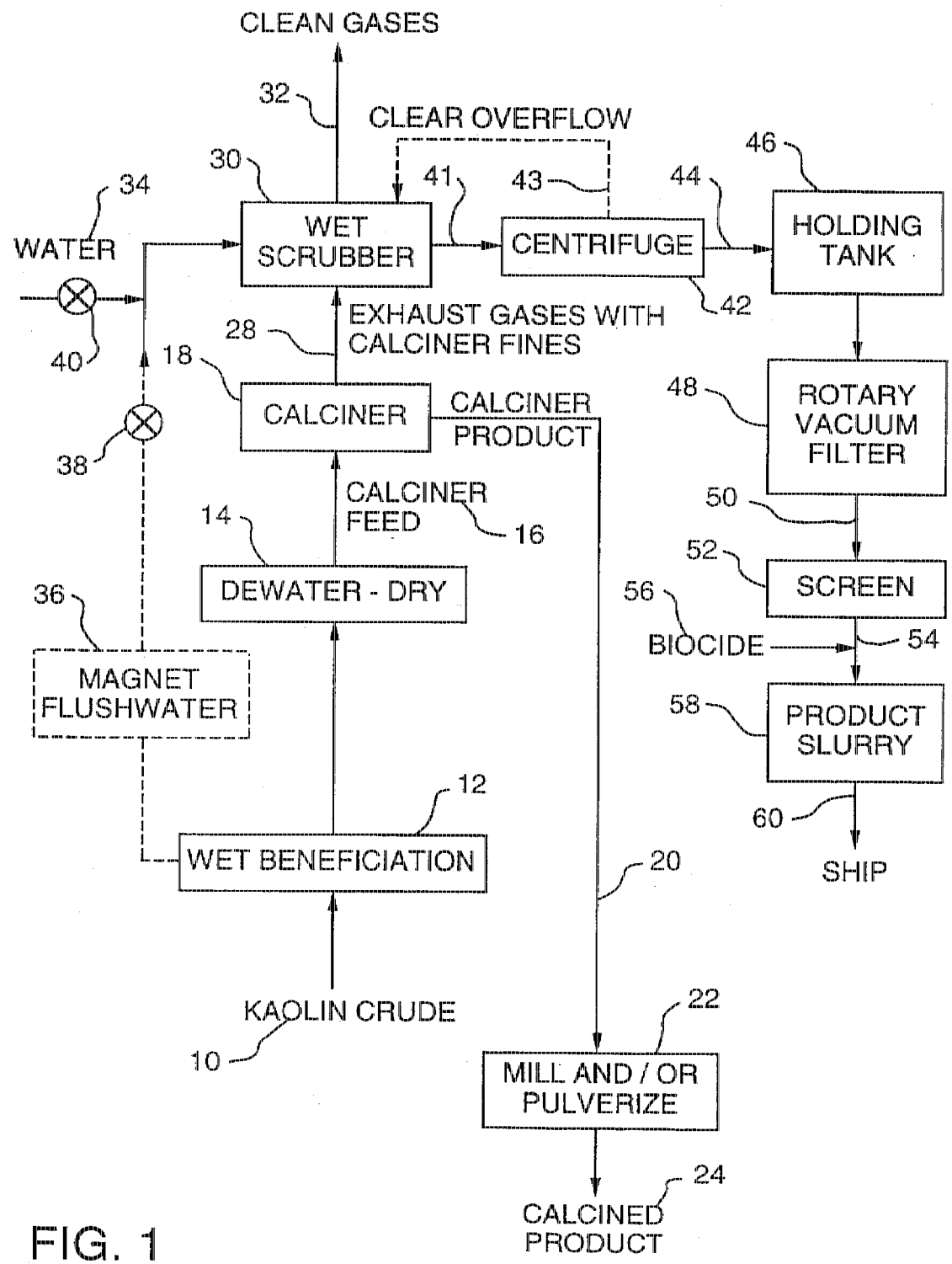
FIG. 1 is a schematic flow diagram, illustrating the process used in practice of the present invention.

Referring to FIG. 1, a schematic block diagram appears illustrating the general method utilized in practice of the present invention. A kaolin crude 10 is seen to be subjected to conventional wet beneficiation at 12 after which the resultant kaolin slurry is dewatered and dried as at 14. The latter may include a milling and/or pulverization step, with the resultant calciner feed 16 then being provided to a calciner 18. The initial input crude 10 can be of the sedimentary or similar type utilized in the McConnell et al. U.S. Pat. No. 4,381,948; or can comprise various blends of crudes, as for example the blend described in the Example of U.S. Pat. No. 5,371,051. Other commonly utilized kaolin crudes for calciner feeds can also be employed in the invention. The crude is subjected to wet beneficiation 12 as is known in the art, which may include a number of known steps, including aqueous blunging of the crude, screening, possible use of froth flotation, classification, and/or high intensity magnetic separation. Calcination is effected in calciner 18 at a temperature of at least 1450° C. Lower temperatures, i.e. beneath the kaolin exotherm may be used as are described in U.S. Pat. No. 5,371,051; or if a fully calcined product is desired, then the temperatures in calciner 18 will generally be in the range of 1900° F. to 2100° F., so that the kaolin is heated above the exotherm. Calciner 18 is typically a so-called vertical calciner, such as of the well known Herreschoff type; however other calciners, including rotary calciners can be used.

Pursuant to the present invention, the output from calciner 18 is provided for milling and/or pulverization at 22 to ultimately provide a product at 24. Fuel 26 is provided to calciner 18, and pursuant to the present invention, exits as hot exhaust gases at 24 which, however, entrain large quantities of calciner dust. The latter consists essentially of kaolin frees the majority of which are at least partially calcined. Quantities of the fines (up to 25 to 35%), are however substantially uncalcined—i.e. remaining as hydrous kaolin. The precise extent of calcination depends upon the temperature in calciner 18, and upon flow conditions and the like as will effect dwell time within the calciner for such fines. Pursuant to the invention, the exhaust gases are passed through a wet scrubber 30 which can, for example, be of the high pressure venturi type, in which the calciner exhaust stream passes cross-current to a curtain of water issuing from an array of venturi nozzles, whereby the stream is washed by water. The curtain of water provided from the nozzles passes through the wet gases and remove the particulate matters which accumulate in a scrubber sump. The cleaned exhaust gases are then provided to atmosphere as clean gases at 32. The input water used at the scrubber can either be provided directly from a well or municipal water source as at 34; or alternatively, it is found to be advantageous where the wet beneficiation 12 includes a magnetic separation step, to utilize as the water input to scrubber 30 the magnet flush water 36. Valves 38 and 40 are shown in the schematic to suggest the alternate possibilities for the scrubber water. Use of the magnet flush water is advantageous in that such water, having been utilized to flush the magnet matrix (which in the kaolin art is typically a porous steel wool), contains substantial quantities of minute kaolin particles which are contaminated or mixed with titaniferrous impurities. These flushed particles are found to be of some value when added to the kaolin materials otherwise recovered pursuant to the invention.

The output from the wet scrubber at 41 is typically a 2 to 7% solids aqueous slurry (possibly containing small additions of titaniferrous materials in combination with kaolin). Since the exhaust gases at 28 to the wet scrubber can include substantial quantities of acidic gases such as carbon dioxide, the kaolin suspended in the slurry output at 40 tends to be at least partially flocced. If such material is screened on a 325 mesh screen, a residue of about 2.5% is typical, which tends to be somewhat excessive for use in papermaking. The slurry 41 is, however, passed through a centrifuge 42, preferably of the disc-nozzle type, as for example the well known Merco centrifuge. This partially dewaters the slurry and provides an output at 44 which has about 17 to 20% solids. The work performed on the kaolin in being processed at the centrifuge nozzles tends to break up floccs and agglomerates, so that residue at line 44 will be much improved, to about 0.5% on a 325 mesh screen. The clear water overflow 43 from centrifuge 42 can be recycled for use at wet scrubber 30, thereby providing a significant water conservation measure.

The slurry from 44 is provided to a holding tank 46, and then is passed through a further dewatering apparatus at 48, preferably a conventional rotary vacuum filter. The output from the latter at 50 is at about 39 to 41% solids. After being screened at 52, the output at 54 may be provided with a small quantity of biocide as shown at 56 to finally yield a product slurry at 58, ready for shipment at 60 to a paper manufacturer where the slurry may be used in the papermaking process. Typically the paper maker will dilute the shipped slurry, for example to about 30% solids, for use of same in manufacture of newsprint and the like, the important point being that the product slurry as shipped at 60 is ideal for furnishing to the ultimate user. Thus pursuant to the invention, the previously discarded, wasted, or recycled fines from the calciner 18 are directly recovered as a product slurry for use by the paper maker.

The practice of the present invention will now be illustrated by Examples, which are deemed illustrative of the invention and not delimitative thereof.

EXAMPLE I

A sample of partially calcined kaolin frees pursuant to the invention was obtained by the process shown in FIG. 1. The calcination process from which the fines were recovered was substantially that used to produce the Alphatex® product of the assignee ECC International, Inc., which process is generally described in the aforementioned U.S. Pat. No. 4,381,948. High intensity magnetic separation was used in the calcination, whereby the magnet flush water was used in scrubber 30. Calcination temperatures were in the range of 1900° to 2100° F. The recovered frees were first dried and their pigment properties determined. These are shown in Table I in comparison to conventional Alphatex, and in comparison to three control samples of the assignee's Opacitex® product, which is a high opacity, low brightness calcined product of the present assignee, produced generally in accordance with the procedures of U.S. Pat. No. 5,137,574. The performance of these several pigments was also evaluated as a filler in newsprint. The resulting sheet properties appear in Table II, where values are interpolated for 4% filler level. The major difference between the sample of the invention and the Opacitex controls are sheet brightness. The sample of the invention gives lower sheet brightness because of the lower pigment brightness deriving from the feed used. Opacity is comparable.

TABLE I

| | Alphatex Control 1 | Opacitex Control 1 | Opacitex Control 2 | Opacitex Control 3 | Product of Invention |
|---|---|---|---|---|---|
| Description | Powder | Powder | Powder | Powder | Powder |
| Brightness | 92.2 | 80.5 | 79.5 | 79.8 | 73.7 |
| L | 97.43 | 93.79 | 93.2 | — | — |
| a | 0 | 0.39 | −.11 | — | — |
| b | 2.19 | 6.2 | 6.16 | — | — |
| % TiO$_2$ | 1.04 | 1.92 | — | — | — |
| % Fe$_2$O$_3$ | 0.569 | 0.806 | — | — | — |
| Residue @ 325 mesh | 0.0076 | 0.0053 | — | — | — |
| % Moisture | 0.8 | 0.5 | — | — | — |
| pH | 6.7 | 6.1 | — | — | — |
| PSD: | | | | | |
| 10 | 99 | 100 | 99 | 99 | 99.7 |
| 5 | — | — | 97 | 97 | 98.1 |
| 2 | 91 | 90 | 87 | 89 | 96 |
| 1 | 85 | 77 | 75 | 78 | 84.3 |
| 0.5 | 58 | 54 | 52 | 59 | 54.4 |
| 0.25 | 11 | 10 | 12 | 21 | — |

TABLE I-continued

| | Alphatex Control 1 | Opacitex Control 1 | Opacitex Control 2 | Opacitex Control 3 | Product of Invention |
|---|---|---|---|---|---|
| Surface Area | 23.8 | 25.7 | — | — | — |
| Einleiner Abrasion* | — | — | 2.5 | 2.1 | — |

*Einleiner Abrasion is determined by a procedure similar to that described in U.S. Pat. No. 5,011,534. The Sample to be tested is prepared, however, at 10% solids, and screen wear evaluated after 174,000 revolutions. The Einleiner Abrasion is reported in mg weight loss per 100,000 revolutions.

*Einleiner Abrasion is determined by a procedure similar to that described in U.S. Pat. No. 5,011,534. The Sample to be tested is prepared, however, at 10% solids, and screen wear evaluated after 174,000 revolutions. The Einleiner Abrasion is reported in mg weight loss per 100,000 revolutions.

TABLE II

| Comparison of Samples as 4% Filler for Newsprint | | | |
|---|---|---|---|
| Filler | Brightness | Sheet Scatter | Printing Opacity |
| Unfilled | 52.9 | 413 | 91.9 |
| Alphatex Control 1 | 57.8 | 573 | 94.6 |
| Opacitex Control 1 | 57.2 | 580 | 94.8 |
| Opacitex Control 2 | 57.0 | 555 | 94.5 |
| Opacitex Control 3 | 56.9 | 543 | 94.2 |
| Product of Invention | 55.9 | 535 | 94.3 |

EXAMPLE II

A further sample of partially calcined kaolin fines was obtained as in Example I. Pigment properties of this sample are shown in Table III in comparison to a further Opacitex® control. The higher brightness and abrasion of the invention product—as compared to the product in Table I—arises in that the sample derives from a different calciner, possibly operating at somewhat higher temperatures or slightly differing feed rates.

TABLE III

| | Opacitex Control 4 | Product of Invention |
|---|---|---|
| Brightness | 79.1 | 80.3 |
| pH | 6 | 6.3 |
| % Residue | 0.0008 | — |
| "L" | 93.08 | — |
| "a" | 6.23 | — |
| "b" | 0.55 | — |
| % < 2 μm | 90.6 | — |
| Einleiner Abrasion | — | 3.1 |

EXAMPLE III 48 gsm handsheets were made using repulped newsprint. Fillers were added at levels targeting 2, 4, 6 and 6%. These sheets were calendered prior to testing. Sheet properties vs. filler level interpolated from the resulting data for 4% loading are given in Table IV.

The product of the invention is seen to provide equivalent or superior optical and print properties as compared to Opacitex®.

TABLE IV

| | Evaluation of Products in Newsprint 48 GSM 4% Filler | | | | | | | |
|---|---|---|---|---|---|---|---|---|
| | Brightness | Scatter | Opacity | Burst Factor | Coefficient of Fraction | Print Thru | Show Thru | Strike Thru |
| Opacitex Control 4 | 61.4 | 677 | 92.9 | 11.9 | 0.425 | 0.095 | 0.04 | 0.045 |
| Product of Invention | 61.7 | 686 | 93.1 | 11.9 | 0.433 | 0.087 | 0.04 | 0.047 |

Using an IGT AIC2 Printability Tester, the following procedures were used to calculate the translucency (show-through) of newsprint, the apparent increase in translucency due to ink penetration (strike-through), and the combined effect of translucency and ink penetration (print-through) by measuring marked positions on a paper sample before and after printing. Samples to be tested are cut to a test size, a minimum of six are considered necessary to obtain a reliable result. Densitometer readings are taken at eight to ten positions on the wire side of each sample using the black filter setting. Each sample is backed by the other five of the same set. (Termed self-backed—Doo). Densitometer readings are taken at eight to ten positions on the wire side of each sample with the sample backed by a solid black surface. (Termed black-backed—DB) For printing (in a controlled atmosphere), the AIC2 is set at 3.5 m/s constant speed in conjunction with 20 kgf printing pressure, bottom sector, with a paper backing (six thicknesses of manila folder) on the printing sector. 1.0 ml of ink are allowed to distribute on the inking unit for 5 minutes. Then two aluminum printing discs are inked for sixty seconds. The samples are printed on the felt side. The samples are alternated to obtain similar conditions over the range of ink film density covered between the first and last prints. After printing eight to ten densitometer readings are taken on the wire side which are now backed by a solid black print. (Termed back-of-print—DP) Eight to ten densitometer readings are taken on the solid black print. The print through figures are calculated as follows:

a. Average the sets of eight to ten readings per strip
b. SHOW-THROUGH
   Black-backed (DB minus self-backed Doo)

$DB - Doo = \log_{10} \frac{Roo}{RB}$ c. STRIKE-THROUGH
   Back-of-print (Dp) minus Black-backed (DB)

$Dp - DB = \log_{10} \frac{RB}{Rp}$ d. PRINT-THROUGH
   Back-of-print (Dp) minus Self-backed (Doo)

$Dp - Doo = \log_{10} \frac{Roo}{Rp}$ or Show-through + Strike-through

While the present invention has been set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. In a method for producing a calcined kaolin by the steps of wet beneficiating a crude kaolin to form a slurry of the beneficiated kaolin; dewatering the slurry to form a substantially dry calciner feed; and calcining the feed at a temperature of at least 1450° F. by passing a stream of hot gases through a calciner in which the kaolin feed is resident, whereby an exhaust stream of said hot gases is generated which entrains quantities of partially calcined and hydrous kaolin pigment fines; the improvement enabling useful application of said kaolin pigment fines; comprising: recovering said kaolin pigment fines from said exhaust stream by passing said exhaust stream through a wet scrubber to recover a dilute slurry, and partially dewatering said dilute slurry to produce a kaolin product for direct use in papermaking without further processing of said kaolin pigment fines.

2. A method in accordance with claim 1, wherein said recovered fines are provided as an aqueous product slurry for said use in papermaking.

3. A method in accordance with claim 2, wherein said recovered pigment has a brightness of from 72±2 to 78±3.

4. A method in accordance with claim 3, wherein said crude kaolin has been calcined at temperatures in the range of 1900° F. to 2100° F., said recovered pigment brightness being 78±2, having a porosity of 0.8 to 0.9 °/g, and an einleiner abrasion of 2 to 4 mg weight loss.

5. A method in accordance with claim 4, wherein said einleiner abrasion is in the range of 2 to 3 mg weight loss.

6. A method in accordance with claim 2, wherein the feed is calcined at temperatures in the range of 1900° to 2100° F.

7. A method in accordance with claim 5, in which the wet beneficiation of said kaolin crude includes a step of magnetic separation wherein the kaolin is passed as an aqueous slurry through a porous ferromagnetic magnetic matrix positioned in a magnetic field to remove titaniferous impurities from said kaolin, the matrix being periodically flushed with water to remove the accumulated impurities; and wherein the flush water carrying the titaniferous impurities is used to effect said scrubbing of said exhaust gases, whereby the titaniferous impurities are recovered and usefully added to said product slurry.

8. A method in accordance with claim 6, wherein the dilute slurry from said scrubber has a solids content of 2 to 7%; and is partially dewatered to a solids content of 39 to 41%.

9. A method in accordance with claim 8, wherein the step of partial dewatering includes passing of the dilute slurry from the scrubber through a disc nozzle centrifuge, where work performed on the kaolin fines breaks up aggregates to reduce the +325 mesh residue in the product kaolin pigment fines.

10. A method in accordance with claim 9, wherein clear water overflow from said centrifuge is recycled to said wet scrubber to conserve water.

11. A method in accordance with claim 1, wherein said dewatering of said dilute slurry includes spray drying said kaolin product to produce a dry kaolin product for said direct use in papermaking.

12. A method for preparing a slurry of a partially calcined kaolin clay pigment for use in papermaking, comprising the steps of:

scrubbing the exhaust stream of a calciner in which a substantially dry and beneficiated crude kaolin is undergoing calcining at temperatures of at least 1450° F. to recover a slurry of at least partially calcined kaolin fines which are entrained in said exhaust stream; and partially dewatering said slurry from said scrubber to yield a product slurry of said partially calcined kaolin pigment for direct use in papermaking without further processing of said kaolin pigment.

13. A method in accordance with claim 12, wherein said slurry is dewatered to about 39 to 41% solids for shipment, and is subsequently diluted by the paper maker for said use in papermaking.

14. A method in accordance with claim 12, in which said scrubbing recovers additional fines comprising hydrous kaolin; the resultant kaolin pigment in said product slurry being characterized by having a porosity of 0.8 to 0.9 $^c$/g, a brightness of 78±2, and an einleiner abrasion of 2 to 3 mg weight loss.

15. In a method of preparing newsprint wherein a mineral filler is incorporated into the paper furnish to improve brightness, opacity, and ink print-through in the finished newsprint; the improvement wherein said mineral filler comprises partially calcined and hydrous kaolin fines which have been recovered as calciner dust from the exhaust gases generated during calcining of a kaolin crude at temperatures of at least 1450° F., and which said kaolin fines have not been subjected to any further processing.

16. The method of claim 15 wherein said crude kaolin has been calcined at temperatures in the range of 1900° F. to 2100° F., said calcined fines having a brightness of 78±2, a porosity of 0.8 to 0.9 $^c$/g, and an einleiner abrasion of 2 to 3 mg weight loss.

* * * * *